United States Patent [19]

Walk et al.

[11] Patent Number: 5,496,663
[45] Date of Patent: Mar. 5, 1996

[54] LITHIUM ION BATTERY WITH LITHIUM VANADIUM PENTOXIDE POSITIVE ELECTRODE

[75] Inventors: Charles R. Walk, Herndon; Nehemiah Margalit, Burke, both of Va.

[73] Assignee: Tracor Applied Sciences, Inc., Rockville, Md.

[21] Appl. No.: 420,294

[22] Filed: Apr. 11, 1995

Related U.S. Application Data

[63] Continuation-in-part of Ser. No. 292,427, Aug. 19, 1994, abandoned.

[51] Int. Cl.$^6$ .............................. H01M 4/02; H01M 4/36
[52] U.S. Cl. .............................................. 429/218; 429/232
[58] Field of Search ........................................ 429/192, 194, 429/218, 232; 205/59

[56] References Cited

U.S. PATENT DOCUMENTS 5,232,795  7/1993  Simon et al. .......................... 429/192
5,316,875  5/1994  Murai et al. .......................... 429/194

*Primary Examiner*—Prince Willis, Jr.
*Assistant Examiner*—Richard H. Lilley, Jr.
*Attorney, Agent, or Firm*—Muday & Stanton

[57] ABSTRACT

A lithium ion battery comprising a negative electrode, a non-aqueous solvent and a positive electrode having $LiV_2O_5$ admixed with a conductive material. The conductive material is preferably carbon in an amount ranging from about 2 percent to 20 percent by weight of the positive electrode. Ten percent by weight is preferred. The $LiV_2O_5$ is formed by discharging an admixture of $V_2O_5$ and the conductive material in an electrochemical reactor with a lithium metal negative electrochemical and having an electrolyte salt in a non-aqueous solvent to reduce by one Faraday per mole of $V_2O_5$ the admixture to convert all of the $V_2O_5$. The cell is preferably discharged to about 2.8 volts to form the $LiV_2O_5$ positive electrode which is then removed and formed into a predetermined electrode configuration for use as a positive electrode in a cell without lithium metal present.

5 Claims, No Drawings

LITHIUM ION BATTERY WITH LITHIUM VANADIUM PENTOXIDE POSITIVE ELECTRODE

This is a continuation-in-part of prior application entitled LITHIUM ION BATTERY WITH LITHIUM VANADIUM PENTOXIDE POSITIVE ELECTRODE, filed Aug.19, 1994, having Ser. No. 08/292/427, now abandoned.

FIELD OF THE INVENTION

The present invention relates to a rechargeable or secondary battery using lithium chemistry. More particularly the present invention relates to an improved electrochemical cell having a positive electrode in which the electrochemically active material is $LiV_2O_5$ without the presence of lithium metal.

BACKGROUND OF THE INVENTION

Rechargeable or secondary batteries such as those used in computers, hearing aids, radios, cellular telephones and the like have found wide acceptance as a useful source of energy. The ability to deliver power at appropriate currents and voltages over a long period of time with regular recharging is important in making many of these devices popular and commercially successful.

As more sophisticated electronic equipment is developed that uses its own self-contained energy source, the limitations of the conventional and well known secondary batteries become more important. Size and shape and weight considerations for the power source limit the development of most portable electronic products, at least forcing compromises in performance or life or range of use.

Lithium batteries have added greatly in the development of newer electronic devices because lithium batteries have a high energy to weight and/or volume ratio. Lithium batteries have been particularly important as primary batteries, which are those that are capable of producing electrical current by an electrochemical reaction in the discharge mode one or at best two or three times. Most lithium batteries are not rechargeable, not operating in the secondary mode.

Portable devices such as computers, camcorders, telephones and the like use nickel-cadmium or nickel-metal hydride batteries as the primary power source and a small lithium battery as a backup power source for memory protection and the like, usually in the primary battery configuration.

Attempts to make secondary lithium batteries using lithium metal as the negative electrode's active material have been made, resulting in the formation of pyrophoric, finely divided metal, inefficient utilization and explosiveness due to electrical short circuits. While attempts to continue the use of the lithium metal or its alloys are continuing, the present state of the art calls for the use of special materials to contain the lithium in an ionic form; hence, the term "lithium-ion" is applied to a new emerging class of secondary cells and batteries.

Presently there are several lithium ion technologies that have been proposed, in which various negative electrode and positive electrode materials are employed. All are high voltage, nominally between 3.0 and 4.0 volts depending upon the specific electrochemistry used.

The negative electrode of lithium ion batteries is generally carbon in some form, such as petroleum coke or graphite, with graphite being preferred due to the ability to provide greater capacity at higher potentials than petroleum coke in particular or disordered carbons, in general. The positive electrode materials are most often transition metal oxide materials such as those using cobalt, nickel or manganese. There are four positive electrode materials presently used in lithium ion batteries, and all are similar in ability but slightly different in operating voltages. The preferred materials are $LiNiO_{02}$, $LiCoO_2$ and $LiMn_2O_4$ in specific forms because they are capable of being manufactured chemically in a fully lithiated state. Because of this, cells are manufactured in the discharged state with the positive electrode material acting as the reservoir of lithium ions needed for cell reactions, avoiding the use of highly active lithium metal.

It has been understood that there must be a quantity of lithium metal incorporated into a $V_2O_5$ cell to provide a source of lithium ions. These cells include lithium metal foil laminated with carbon as the negative electrode. The principle difficulty that has been encountered in the development of the $V_2O_5$ lithium batteries such as those that can be operated as secondary batteries is, not surprisingly, the lithium metal. Lithium use metal increases costs, decreases safety if only for the presence of residual finely divided lithium metal in discarded cells, and makes overall assembly more difficult if not more costly. One such lithium secondary battery is shown in U.S. Pat. No. 3,929,504. In that cell, the negative electrode comprises a lithium metal ribbon pressed on to an expanded copper metal grid. While the battery is effective over a large number of recharge cycles, it is not without the inherent danger of any cell containing lithium metal.

The prior art has not at this point developed an electrochemical cell configuration that uses a lithium metal free $V_2O_5$ cell. At the present time, useful lithiated $V_2O_5$ is not available and this material has, essentially, not been found to exist alone in nature. $LiV_2O_5$ is not available and there is no reported method for its manufacture.

Simon U. S. Pat. No. 5,232,795 discloses a rechargeable cell having a solid electrolyte. The cell comprises a graphite negative electrode, a lithium salt in a polymer as an electrolyte, and a cathode including, inter alia, $LiV_2O_5$. There is no suggestion as to where the $LiV_2O_5$ can be obtained, in contrast with the sole example in which $LiCoO_2$ is shown and referenced as being sold by Aldrich. Simon fails to enable one to make such a cell as no known source of suitable $LiV_2O_5$ presently exists.

Labat et al U.S. Pat. No. 5,219,677 discloses a rechargeable cell having a cathode based on $V_2O_5$. The cell includes a lithium or lithium alloy anode, an electrolyte having a lithium salt in a nonaqueous solvent, and a cathode based on vanadium oxide. Labat et al teaches that the cathodic version of $LiV_2O_5$ in their invention is formed by discharging a cell having a $V_2O_5$ cathode and lithium anode such that the cell is charged to 3.8 volts. Discharging was stopped at 2.8 volts in what Labat et al terms a prior art cell and a second cell in accordance with the Labat et al invention was discharged to 2.0 volts. An advantage is disclosed for the cell that was discharged to a greater extent.

Labat et al clearly teach that they form a preferred form of cathodic material that is designated gamma $LiV_2O_5$. Cathodes that are discharged to 2.8 volts are shown to be inferior. In any event, Labat et al does not disclose a method of producing $LiV_2O_5$ for use in cells that do not include lithium metal, either in metal or alloy form. Labat et al further does not disclose that an effective cathode material including $LiV_2O_5$ may be prepared unless it is initially discharged to about 2.0 volts as described in the reference.

Finally, Labat et al does not disclose that $LiV_2O_5$ may be used in cells that do not have lithium metal or metal alloy.

It would be of great advantage to the art if $LiV_2O_5$ were available in some form that would permit the use of that material in electrochemical cells without the presence of lithium metal in any form. It would also be of great advantage if a cathode using $LiV_2O_5$ could be conveniently prepared for use with such cells.

Accordingly, it is an object of the present invention to provide an electrochemical cell that employs $V_2O_5$ in a lithiated form without the presence of lithium metal in the cell.

Another object of this invention is to provide a positive electrode which is formed from $LiV_2O_5$.

Other objects will appear hereinafter.

SUMMARY OF THE INVENTION

It has now been discovered that the above and other objects of the present invention may be accomplished in the following manner. Specifically, the present invention provides a new positive electrode material for lithium ion batteries in which the positive electrode material is formed from $LiV_2O_5$. The $LiV_2O_5$ positive electrode material is then used in an improved cell that has no lithium metal to thereby dramatically improve safety issues associated with lithium electrochemical cells.

The present invention solves the safety issues that have kept this high energy, high single cell voltage, stable, rechargeable $C/LiV_2O_5$ electrochemical system from being utilized in those many applications that could benefit from this new system. Both the $LiV_2O_5$ electrode and the cell using the $LiV_2O_5$ electrode have many commercial applications, thereby expanding the role of lithium batteries in the market place.

The method of this invention comprises the steps of forming a cathode material having $LiV_2O_5$ as its principal active material. The steps include (1) reducing $V_2O_5$ electrochemically using lithium metal or a lithium alloy as the anode and an appropriate electrolyte by one Faraday per mole of $V_2O_5$, and (2) removing the reduced material from the cell, forming the removed material into a positive electrode, and inserting the new positive electrode in a cell substantially free from lithium metal or lithium metal alloys.

DETAILED DESCRIPTION OF THE PREFERRED EMBODIMENT

The present invention relates to an improved lithium ion cell in which the positive electrode of this invention is used to provide a safe and effective battery without the use of lithium metal. The positive electrode has a lithiated form of $V_2O_5$ that has been previously reduced electrochemically by the reaction of no more than about one electron per molecule of $V_2O_5$ to form $LiV_2O_5$ without any lithium metal in the positive electrode material.

As has been noted above, $LiV_2O_5$ is not commercially available and it is not described in the literature. It is formed by the method of this invention, in an electrochemical reactor by discharging $V_2O_5$ in the presence of lithium or lithium alloy with a non-aqueous solvent by limiting the reduction of $V_2O_5$ to no more than one Faraday per mole of $V_2O_5$. Graphite or another suitable conductive material is needed since $V_2O_5$ is not conductive enough by itself. The $LiV_2O_5$ material thus formed is then removed from the reactor by one of several alternative methods. At this time a ready to use $LiV_2O_5$ positive electrode material is present that may easily be used in nonaqueous cells without any lithium metal or metal alloy in any form.

The essence of the invention is that the $LiV_2O_5$ positive electrode material thus formed is formed electrochemically by reducing $V_2O_5$ with Lithium by one Faraday per mole of $V_2O_5$ during discharge in the reactor. Successful use of this positive electrode material thereafter in a cell containing no lithium metal has herein been found to be possible such that the cell operates as a rechargeable cell over many cycles and, importantly, without lithium metal in any form as a potential hazard.

The electrolytes of the present invention may be any of the known lithium ion containing salts dissolved in conventional solvents that have been found useful in lithium batteries but their composition may vary between the reactor and the production cell. The solvents generally are aprotic, stable toward lithium, have low viscosity, high dielectric constant, high solvating power for suitable electrolyte salts, economical in cost and availability and have minimum impurities. Preferred are propylene carbonate, dimethylcarbonate, gamma butyrolactone, tetrahydrofuran, 1,2 dimethoxythene, ethylene carbonate, diethyl-carbonate, diethyl ether and dioxalane. The function of the electrolyte in the first portion of the present invention, forming the $LiV_2O_5$ positive electrode material in an electrochemical reactor is to carry the lithium ions a negative electrode, for example, lithium metal or metal alloy, into the $V_2O_5$ during the discharge step. The second function of such an electrolyte is to act as a conventional nonaqueous solution in a secondary lithium ion cell during operation of such a cell in which the positive electrode was formed from the $LiV_2O_5$ positive material of this invention without any lithium metal present in the cell, particularly in the anode portion thereon.

The electrolyte salts most preferred are those that are stable, have high conductivity, have an acceptable molecular weight, have no reactivity or side reactions and are safe, available and nontoxic. Preferred are lithium hexafluorophosphate, lithium hexafluoroarsenate, lithium bis(trifluoromethyl sulfonyl imide), lithium trifluoromethanesulfonate or lithium triflate, lithium tris (trifluoromethyl sulfonyl) methide, lithium tetrafluoroborate, lithium perchlorate, lithium tetrachloroaluminate and lithium perflourobutane. Again the salts useful in this invention need to be chosen to function in two separate operations, first during formation of the $LiV_2O_5$ in the reactor and second during operation of the final cell product.

Most preferred are solvent mixtures, such as an equal mixture of propylene carbonate and dimethlyene carbonate and an equal mixture of dimethyl carbonate and diethyl carbonate. Most preferred electrolyte salts are lithium hexafluorophosphate and lithium bis(trifluoromethyl sulfonyl imide) for use, respectively, in the two solvent mixtures identified above.

It is contemplated that the reactor used to form the $LiV_2O_5$ cathode or positive electrode material by discharging $V_2O_5$ with a lithium metal containing anode may use the same or different salt/solvent combinations than the final cell using the cathode and not containing any lithium metal. For example, more effective but more costly salt/solvents may be used to produce the $LiV_2O_5$ positive electrode material in a factory where recycling and reclaiming the salt/solvent is feasible, while a less expensive or less environmentally unfriendly solvent/salt combination may be used in products sold and used elsewhere. The particular salt and solvent choices depend on design parameters that are not part of this invention.

The concentration of lithium ion in the non-aqueous solvent will in part depend upon the solvent and salt, but should be sufficient to permit discharge of the $V_2O_5$ and the conductive material which together form the physical material being made into the positive electrode material. Typical concentrations range from less than 0.5 molar to as much as 2.0 molar, with 0.85 to 1.5 molar being found using different electrolyte salts and solvents. Concentrations of between 1.0 and 1.5 molar are standard in the art and thus preferred, with about 1.2 molar being most preferred. The electrolyte salt and solvent mixture should have sufficient lithium ion conductivity, preferably between $3 \times 10^{-3}$ and $2 \times 10^{-2}$ ohm$^{-1}$–cm$^{-1}$ over a range of operating temperatures. The liquid range should be from less than $-40°$ C. to more than $70°$ C., and should be thermally stable to at least $70°$ C. for the cell. A more limited temperature range will suffice for the reactor.

The amount of conductive material will depend upon the material chosen. Graphite is preferred as a conductive material because it is a known battery material that can be used in its known manner with already existing manufacturing facilities. The amount by weight of graphite or other conductive material may be as little as 2 percent by weight and as much as 20 percent, with 10 percent by weight, based on the $V_2O_5$ being preferred. Other forms of carbon are also used.

The lithium metal free negative electrodes used with the positive electrode of this invention are those materials that react according to the following formal reaction of $xC+Li \Longleftrightarrow LiC_x$. Examples include graphites and synthetic graphites, fibers, cokes, mesocarbons, doped or substituted carbons (with boron, nitrogen or phosphorous, for example) and the Fullerenes. These last materials comprise a series of carbon atoms attached together in ball like formations. A typical formulation would be $C_{60}$. Some Fullerenes incorporate five times the amount of lithium ions as common graphites. Once the reactor electrochemical cell has been loaded, it is necessary to discharge $V_2O_5$ in to produce the $LiV_2O_5$ of this invention.

Discharge of the $V_2O_5$ in the reactor is intended to proceed only until about one Faraday per mole of $V_2O_5$ has been discharged. Discharge in this manner produces a smooth voltage curve that can be readily monitored during production of the positive electrode, dropping slowly from the initial voltage over a period of time. As one Faraday of discharge is approached, the slope of the discharge curve changes, dropping faster between about 3.0 volts and 2.4 volts. The ideal cut-off for the discharge is about 2.8 volts. Contrary to the teachings of previously discussed Labat et al U.S. Pat. No. 5,219,677, the cell of this invention is not operated by charging to 3.8 volts and discharging to 2.0 volts.

If further discharge of the $V_2O_5$, as per Labat, takes place, the thus formed material has only limited utility as a cathode or positive electrode material in accordance with the present invention. Rather, contrary to what Labat et al clearly teaches, a totally satisfactory cathode is formed after being discharged to 2.8 volts. It has been found that if one discharges much more than one Faraday, other materials such as $Li_2V_2O_5$ are formed and the excessively discharged material is no longer effective as a rechargeable electrode. As the preferred cut-off voltage for producing $LiV_2O_5$ material should be 2.8 volts, the formation process in the reactor should consist of, for example, a constant voltage discharge with a suitable maximum, limiting current, or a pulse regime where discharge voltage does not exceed 2.8 volts.

The positive electrode material of the present invention can be conveniently fabricated into a lithium ion battery. $C/LiV_2O_5$ cells using various electrolytes and non-aqueous solvents as identified above are capable of producing a steady supply of electrical energy at high voltage even after many discharge and recharge cycles. It should be noted that the parameters for cycling of the product cell, especially discharge, could vary from those used in the reactor, depending upon cell design and user application.

Various methods are available for processing the discharged $LiV_2O_5$ into an appropriate form for use as a cathode material. The most straightforward method is to merely remove the discharged $LiV_2O_5$ electrode from the reactor and scrape the material from the supporting grid to form it into a powder form. Another method involves forming the $V_2O_5$ that is to be discharged in the reactor with a soluble binder. After forming the $LiV_2O_5$, the binder is dissolved and again the cathodic material is in the form of a powder for further manufacture and use as a positive electrode.

Alternatively, it may be desirable to use the electrode as it is formed by simply removing it from the reactor and placing it in a cell with the carbon anode described above. Another embodiment of the present invention is to press $V_2O_5$ against a carbonaceous conductive grid or plate under sufficient pressure to allow the cathode material to conduct adequate current via the carbonaceous material. Yet another embodiment is to bind the $V_2O_5$ with a binder and grind or powder the $LiV_2O_5$ after its formation. In this embodiment, the binder need not be soluble since it is ground or powdered along with the $LiV_2O_5$.

Tests have confirmed that the present invention produces a satisfactory lithium metal free cell using $LiV_2O_5$. More than 500 cycles with a 100% depth of discharge cycle are obtained with cells according to the present invention. This is clearly an improved cell that is safe and effective.

While particular embodiments of the present invention have been illustrated and described, it is not intended to limit the invention, except as defined by the following claims.

We claim:

1. A lithium ion battery comprising:
    a lithium free negative electrode, a non-aqueous solvent and a positive electrode including $LiV_2O_5$ admixed with a conductive material, said $LiV_2O_5$ being included in said cell only after forming a quantity of $LiV_2O_5$ in a reactor cell reducing electrochemically an admixture of $V_2O_5$ using a lithium metal containing electrode in a cell having lithium containing electrolyte in a non-aqueous solvent by one Faraday per mole of $V_2O_5$ in said admixture to convert substantially all of said $V_2O_5$ to $LiV_2O_5$, said $LiV_2O_5$ being removed from said cell and formed into said positive electrode; said negative electrode being substantially free of lithium ions when substantially one mole of lithium ions per mole of $V_2O_5$ is in said positive electrode.

2. The battery of claim 1, wherein said conductive material is carbon in an amount ranging from about 2 percent to 20 percent by weight of said positive electrode.

3. The battery of claim 2, wherein said reactor cell is discharged to about 2.8 volts to form said $LiV_2O_5$ positive electrode.

4. A method of making a positive electrode useful for a lithium ion battery, comprising the steps of:
    discharging an admixture of $V_2O_5$ and a conductive material in an electrochemical reactor cell having a lithium containing electrolyte salt in a non-aqueous solvent and a lithium metal containing negative electrode to reduce by one Faraday said admixture to convert substantially all of said $V_2O_5$ and form a $LiV_2O_5$ positive electrode;

removing said positive electrode material from said reactor cell; and forming said positive electrode material into said positive electrode.

5. The method of claim 4, wherein said reactor cell is discharged to about 2.8 volts to form said $LiV_2O_5$ positive electrode.

* * * * *